(12) United States Patent
Van Saanen

(10) Patent No.: US 7,779,955 B2
(45) Date of Patent: Aug. 24, 2010

(54) ANGULARLY DISPOSED PLANAR PEDAL SYSTEM FOR MOTOR VEHICLES

(76) Inventor: Victor Ramon Van Saanen, 623 Pecos St., Spring Valley, CA (US) 91977

( * ) Notice: Subject to any disclaimer, the term of this patent is extended or adjusted under 35 U.S.C. 154(b) by 0 days.

(21) Appl. No.: 12/294,615

(22) PCT Filed: Jan. 10, 2008

(86) PCT No.: PCT/US2008/000436

§ 371 (c)(1),
(2), (4) Date: Sep. 25, 2008

(87) PCT Pub. No.: WO2008/088764

PCT Pub. Date: Jul. 24, 2008

(65) Prior Publication Data

US 2009/0127015 A1    May 21, 2009

Related U.S. Application Data

(60) Provisional application No. 60/879,906, filed on Jan. 11, 2007.

(51) Int. Cl.
*B60D 1/28* (2006.01)

(52) U.S. Cl. ............... 180/271; 180/275; 180/282; 340/467; 340/479

(58) Field of Classification Search .......... 180/271, 180/275, 282, 283, 284, 285; 340/467, 479
See application file for complete search history.

(56) References Cited

U.S. PATENT DOCUMENTS

| | | | | | |
|---|---|---|---|---|---|
| 2,712,359 | A | * | 7/1955 | Kramer | 180/90.6 |
| 3,108,651 | A | * | 10/1963 | Miller | 180/90.6 |
| 3,409,101 | A | * | 11/1968 | Williams | 180/271 |
| 3,756,747 | A | * | 9/1973 | Caffrey | 417/34 |
| 5,697,260 | A | * | 12/1997 | Rixon et al. | 74/514 |
| 6,289,761 | B1 | * | 9/2001 | Reynolds et al. | 74/512 |
| 6,919,801 | B2 | * | 7/2005 | Kim | 340/479 |

* cited by examiner

*Primary Examiner*—Toan C To
(74) *Attorney, Agent, or Firm*—Knobbe Martens Olson & Bear LLP

(57) ABSTRACT

The present invention relates generally to systems and methods designed to reduce the dangers presented by certain unintentional and intentional actions by drivers of motor vehicles, and more specifically to eliminating the panic-based, unintentional acceleration of motor vehicles by drivers in emergency situations as well as the intentional abuse of motor vehicle power by drivers.

17 Claims, 12 Drawing Sheets

ANGULARLY DISPOSED PLANAR PEDAL SYSTEM FOR MOTOR VEHICLES

CROSS REFERENCE TO RELATED APPLICATIONS

This application is the National Stage of International Application No. PCT/US08/000436, filed Jan. 10, 2008, titled ANGULARLY DISPOSED PLANAR PEDAL SYSTEM FOR MOTOR VEHICLES, which claims the benefit of U.S. Provisional Application No. 60/879,906, filed Jan. 11, 2007, titled ANTI-PANIC BRAKING AND ANTI POWER-ABUSE SYSTEMS AND METHODS FOR MOTOR VEHICLES.

FIELD OF THE INVENTION

The present invention relates generally to systems and methods designed to reduce the dangers presented by certain unintentional and intentional actions by drivers of motor vehicles, and more specifically to eliminating the panic-based, unintentional acceleration of motor vehicles by drivers in emergency situations as well as the intentional abuse of motor vehicle power by drivers.

BACKGROUND OF THE INVENTION

Motor vehicle crashes are the leading cause of injury death in America. The National Safety Council (NSC) estimates that several specific driver behaviors and errors contribute to 90 percent of all motor vehicle crashes. Crashes caused solely by vehicle or external factors (e.g., the failure of one or more vehicle components, the condition of the road, the weather, etc.) account for the other 10 percent of crashes.

At its most basic level, driving requires that a driver have the ability to adequately see, think, and react, and of course, these abilities change at different rates for different people as they get older. Not surprisingly, teenage drivers, who must learn new skills needed for driving and who frequently engage in high-risk behaviors, such as speeding and/or driving after using alcohol or drugs, have the highest fatality rate from motor vehicle crashes of all age groups, followed closely, based on miles driven, by older drivers (65 and older).

People 65 and older are the fastest-growing demographic in the United States, and by 2030, a quarter or all licensed drivers in the U.S. will be in that age group. Age alone, however, is not a reliable indicator of driving ability. Some people in their 90s and beyond, for example, are more healthy and fit for driving than many drivers half their age. Still, as a rule, it can be said that the older a person gets, the bigger risk he or she tends to pose as a driver. As the over-65 population grows, more elderly people will be driving more miles and more frequently, a fact which has led the National Highway Traffic Safety Administration (NHTSA) to predict that the number of elderly driver traffic fatalities in the U.S. could triple in number by 2030.

One phenomenon that afflicts young and old drivers alike is unintentional acceleration, also known as "pedal error." The consequences of pedal error can be devastating, as illustrated by two particularly distressing instances of this phenomenon that occurred fairly recently, each of which garnered national news coverage.

In 2001, a thirty-year-old driver backed her father's brand-new S.U.V. into a crowd outside a Southampton, N.Y., night club, injuring sixteen people. She got into the car, put it in reverse, and then twisted around to see if anyone was behind her, her foot slipping off the pedal as she did so. As a result, the trajectory of her right foot was thrown off by a few inches, and when she put her foot back down, what she thought was the brake was actually the accelerator. The car leapt backwards. She panicked. She pressed harder on the accelerator, trying to stop the car. But her action made the car speed up. The driver was parked approximately fifty feet from the night club, and assuming that she was accelerating at a rate of 0.4 g's (not unlikely, given the 342-horsepower vehicle she was driving), she would have covered that fifty feet in roughly 2.8 seconds. Wade Bartlett, an expert in mechanical forensics who has studied more than three dozen cases of unintended acceleration, has said, "When faced with a completely new situation, it would not be unusual for someone to require three seconds to figure out what's going on and what to do about it." In some instances, it has been reported that drivers have mistakenly continued to press the accelerator for up to thirty seconds.

In 2003, an 86-year-old man plowed through a crowded farmers' market on a street closed to traffic in Santa Monica, Calif., striking scores of pedestrians and vendor displays in the process. His car proceeded through the farmers' market for approximately 2 blocks (750 feet), traveling as fast as 70 mph before coming to rest after hitting a ditch. As a result of the accident, 10 people were killed and 63 injured, many grievously so.

In the National Transportation Safety Board (NTSB) investigation which followed the 2003 incident in Santa Monica, the NTSB ruled out many potential causes of accident: weather; driver's experience and familiarity with his vehicle and area; alcohol; illicit medications; insufficient sleep or fatigue. The report instead concluded that the driver had inadvertently accelerated when he intended to brake, a textbook case of pedal error. The report went on to note that the driver most likely reverted to a habitual response of hard braking, or "pumping," the brakes as his stress level increased and the vehicle failed to slow. However, because his foot was on the accelerator instead of the brake pedal, this response led to increased acceleration. The ineffectiveness of the driver's efforts to stop his vehicle and the realization that he was striking objects in his path, very likely increased the already high level of stress affecting him, thereby impeding his ability to quickly detect and correct his earlier error in response execution.

The unintended acceleration that results from pedal error almost invariably causes the afflicted driver to go into a hyper-vigilant or panicked state. When a driver enters a hypervigilant state, he or she becomes desensitized to stimulation from peripheral vision and begins to experience such feelings as helplessness, simplistic 'childlike' thinking, distractibility, and not considering the consequences of one's errors as signs of the stresses. A driver in a hypervigilant state would be looking straight ahead (or behind) at all the things he or she was approaching, riveted by those things and terrified that he or she was about to hit them, but would be unable to steer away from them.

At least four factors have been associated with an increased probability of unintentional acceleration caused by pedal error. It happens more frequently to both older and younger drivers, to people who are unfamiliar with the cars they are driving, and to people who have just gotten into a car and started it up.

Another driver behavior that presents obvious dangers is the intentional acceleration of a motor vehicle, as in unauthorized drag racing. Not surprisingly, most incidents involving intentional acceleration involve teenage drivers.

Based on the foregoing, an urgent need exists for systems and methods directed to preventing not only the unintentional acceleration that results from pedal error but also the most extreme forms of intentional acceleration. While reading the following summary of the invention, the reader should keep in mind that left-foot braking was pioneered in the sixties and has been practiced for decades by race car drivers.

SUMMARY OF THE INVENTION

The present invention provides systems and methods designed to prevent the unintentional acceleration that results from pedal error and to prevent excessive intentional acceleration. One of the more important aspects of this invention is the designation of the left foot as the primary brake control and the right foot as the secondary brake control. Another important aspect of the present invention is the teaching wherein the foot control pedals/panels for all functions (e.g., throttle, brake, clutch, etc.) in each embodiment are disposed in substantial planar alignment to facilitate a sliding foot.

As will become clear in the description that follows, advantages afforded by various embodiments of the invention include, but are not limited to: minimization of the distance and time needed for any foot to travel to reach the desired control; minimization of the possibility of a foot reaching the wrong control; minimization of the possibility of obstructions interfering with a foot reaching the desired control; virtual elimination of the possibility of a panic response (i.e., unintentional acceleration) in emergency driving situations; minimization of the abuse of motor vehicle power, as in unauthorized drag racing; and maximization of a driver's mental feeling of security and competence derived from the knowledge that his or her foot is on the proper control.

From a general standpoint, the present invention entails a re-arrangement and re-shaping of conventional motor vehicle foot control pedals (throttle, brake, clutch) in a manner that designates the left foot as the primary control for braking and the right foot as the secondary control for braking; in addition, at least one additional foot control pedal or panel is provided. It is envisioned that the re-arrangement and re-shaping of the foot control pedals or panels will be implemented in a transitional manner.

In one embodiment, the anti-panic braking and power abuse system of the present invention is implemented by incorporating an additional brake pedal disposed to the far left of the driver's footwell area. In addition, the throttle pedal is re-shaped and re-oriented by angling the pedal 10 degrees to the right (driver's perspective) with respect to its usual non-angled longitudinal orientation. The overall shape of the throttle is changed to assume the shape of an angled rectangular parallelepiped. An additional pedal (referred to as the throttle safety switch) is interposed between the right brake pedal and the re-shaped and re-oriented throttle pedal, the throttle safety switch being shaped to fit between the rightmost edge of the right brake pedal and the throttle. Both the left brake and the right brake pedals are respectively outfitted with lateral stops along the entire length of one side of each pedal. On the left brake pedal, the stop runs up and down the rightmost edge; on the right brake pedal, the stop runs up and down the leftmost edge. These stops serve the purpose of giving a driver the confidence that his or her feet are properly positioned on one or both of the brakes. The lower edge of each pedal in this embodiment is reshaped to curve down toward the floor so as to minimize the possibility of a driver missing the pedals and/or getting his or feet caught beneath the pedals while attempting to brake and/or brace for impact in an emergency situation. In addition, all non-stopped sides of the pedals are beveled in order to facilitate a sliding foot.

In another embodiment, the transition to a flat-surfaced foot control platform is furthered by lengthening the vertical extent of the pedals as well as by clamping control plates about rods positioned transversely through the necks of the pedals of the previously described embodiment. These control plates, at least in the case of the brake and clutch pedals, are cut-out in the area immediately surrounding the pedals, further enabling a driver to have the confidence that his or her foot is properly positioned on the desired pedal. The control plates in this embodiment contact the base of the driver's footwell but are freely slideable along same. This geometry virtually eliminates the possibility of a driver's feet getting caught up beneath the otherwise exposed undersides of the pedals.

In yet another embodiment, the transition to a substantially planar foot control system is continued, the first modification from the immediately preceding embodiment being that the bottom edge of the control plates are fixedly attached to a securing rod that extends transversely across the entire width of the driver's footwell, and the second modification from the immediately preceding being that the upper edge of the control plates are permanently fixed about the pedals. This embodiment represents a factory-implemented version of the present invention.

In still another embodiment (envisioned as a custom, aftermarket adaptation of the present invention), both the position and shape (i.e., height, width, separation, etc.) of the original foot control pedals in a particular type and model of motor vehicle are determined, and a series of appropriately dimensioned blocks are then affixed to the underside of control plates, the center of each block being positioned directly above the center of the original foot control pedal with which it is associated, thereby allowing any car to be retrofitted according to the teachings of the present invention. If the original foot control pedal is wider than it is tall (as, for example, is the case for a conventional brake pedal), its associated block is oriented so that it taller than it is wide (i.e., is longer vertically than it is horizontally), contrariwise for original foot control pedals that are taller than they are wide (e.g., conventional throttle pedals). In addition, the bottom edge of each control plate is attached to a telescoping, spring-loaded rod.

The throttle safety switch employed in each embodiment of the present invention cuts off electrical power to the distributor for varying lengths of time. The current generated by the throttle safety switch does not have to be a constant current; indeed, all that is required to deactivate or activate the distributor for purposes of this invention is an impulse current.

BRIEF DESCRIPTION OF THE DRAWINGS

The accompanying drawings illustrate the present invention. In such drawings.

DETAILED DESCRIPTION OF THE INVENTION

Figure 1:
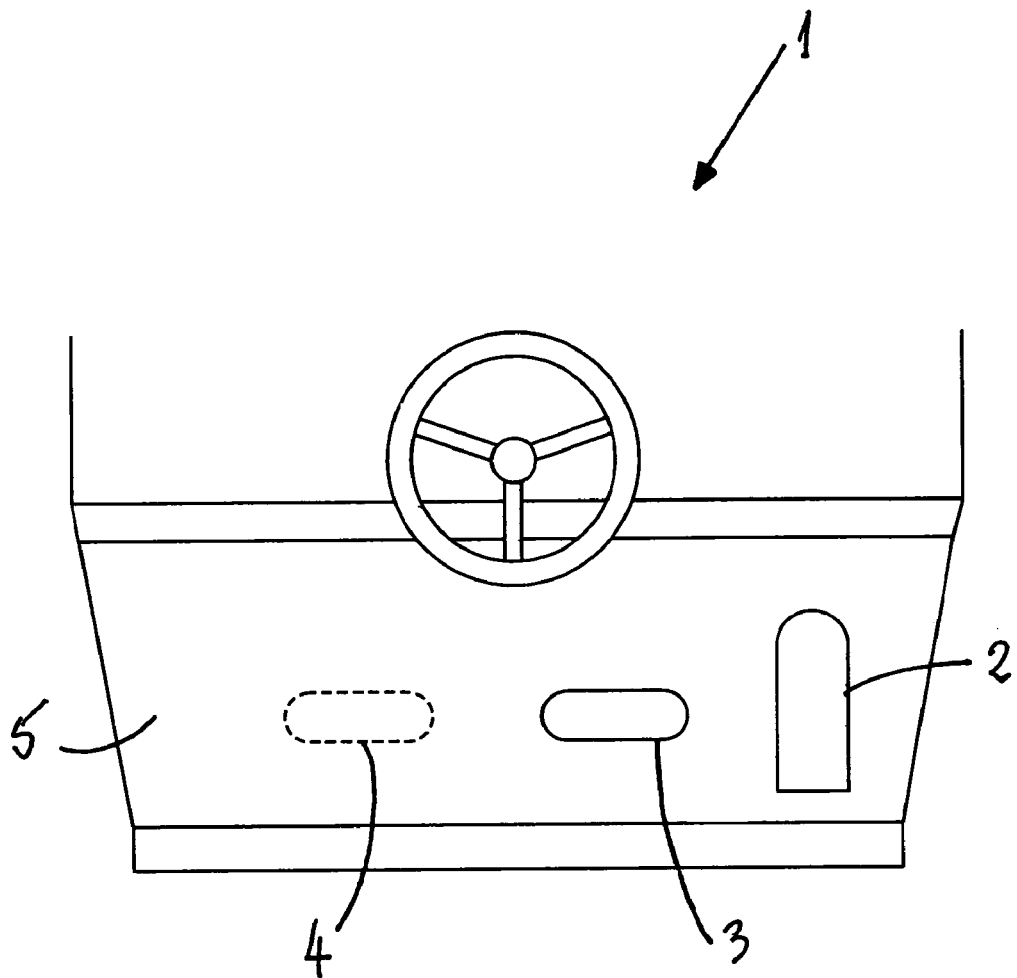
FIG. 1 depicts a prior art driving console, pedals, footwell, and floor of a passenger car or utility motor vehicle.

The present invention provides anti-panic braking and anti power-abuse systems and methods. In operation, the invention prevents the unintentional acceleration that occurs when the driver of a motor vehicle panics in an emergency situation and commits the driving mistake known as pedal error, in which the throttle pedal (i.e., "throttle") is inadvertently depressed instead of the brake pedal (i.e., "brake"). The present invention facilitates identification of the proper pedal not only via optional tactile features (i.e., pedal locators, such as horizontal ribs or other protuberances that allow a driver to know when his or her foot is in the proper position on the pedal depicted in, for example, FIG. 5A), but also by a deliberate reshaping of the pedals. In addition, a throttle safety switch is included in each embodiment of the present invention.

The pedals of the present invention are reshaped in order to exploit a natural physiological reflex exhibited by panicked drivers, but not by drivers who are relaxed, which is that the feet of relaxed drivers are splayed (each to its respective side) by approximately 10 degrees, whereas, when faced with an emergency situation, a driver's feet involuntarily assume a vertical orientation (i.e., in line with the lower legs) and tend to brace for impact by pressing against the controls (hopefully, the brake). By placing the throttle safety switch in angled proximity to the re-shaped throttle (ideally by a separation of no more than a 3/16" to 1/4"), a driver is assured of hitting (either from above or from the side) the throttle safety switch, thereby activating a power cut-off switch that cuts off electricity to the distributor. Therefore, even if a driver misses the right brake pedal entirely, at least the vehicle will not be accelerating. And assuming that the driver's left foot engages the left brake pedal, the vehicle will, as desired, brake to a stop—even in a panic situation.

An optimal feature of the present invention is a panic button, located underneath the throttle pedal (or throttle panel) in every embodiment. This panic button is positioned to activate the same power cut off switch that is engaged when the throttle safety switch is activated, but will only do so when the throttle is pressed down excessively. This arrangement will prevent extreme intentional acceleration (i.e., the intentional abuse of motor vehicle power) but will not otherwise interfere with normal throttle use. (It is anticipated that the precise placement of this switch will be dictated by the NTSB.)

Yet another optimal feature of the present invention is a deactivator switch that enables a driver to deactivate the anti-panic and power-abuse controls of the present invention. The deactivator switch is preferably located to the left of a driver, in a position that is accessible to a driver's left hand but that a driver is unlikely to touch in a panic situation, thereby inadvertently deactivating the system. An example of a situation in which a deactivator switch would be needed is that of smog-checking a car. During smog checks, the rear wheels are engaged by a dynamometer, which allows the rear wheels to rotate at speed (equivalent to as much as an effective speed of 60 mph) but maintains the front wheels in a stationary position. Such a test could not be performed without first deactivating the system of the present invention, as it would be interpreted by the system (namely, by the computer interrogator, described in detail hereinbelow) as an unsafe condition, essentially akin to the excessive, simultaneous use of brake and power as that encountered immediately prior to the initiation of drag racing.

Still another optimal feature of the present invention is the placement of baffles, or guard panels, around and in-between the various pedals and panels. This prevents foreign objects (toys, etc.) from interfering with the proper functioning of the control pedals/panels.

Yet another optimal feature of the present invention is a horizontally adjustable wall stop provided on the rightmost side of the footwell, adjacent the throttle pedal or panel. This stop allows a driver to customize the effective width of the throttle, thereby ensuring that his or her right foot is sufficiently close to the throttle safety switch that the throttle safety switch will be activated in an emergency driving situation. This feature is necessary because not all drivers' feet are the same width, and for this reason, allowances must be made to accommodate a wide range of foot widths.

An additional optimal feature in manual transmission embodiments of the present invention is the coordination of a left brake pedal (or panel) and a clutch pedal (or panel), thereby preventing both the rollback of a vehicle on a hill that commonly occurs when a clutch pedal is depressed and a brake is not engaged, as well as the unintentional movement of vehicle forward (when parked facing downhill) in such a situation.

In every embodiment of the present invention, the brake pedal or panel (collectively referred to herein as the "brake pedal") is adapted for use by the left foot and is below (i.e., positioned lower than) every other pedal or panel, usually by ¼" but, if desired, by as much as ½". Again, this geometry ensures that a sliding foot will encounter no obstacles (including the side of the brake pedal or panel) on its way to the brake(s). In addition, in the idle position, the throttle safety switch (which has a head, a control rod, upper and lower contact ramps, each of the contact ramps gradually sloping toward the throttle, the non-sloping portion of the upper contact ramp having a generally planar shape) is typically ¼" to ½" below the throttle, so that the driver's right foot will not engage the throttle safety switch on its route to the right-side brake when the vehicle is idling. During low power conditions (i.e., moderate depression of the throttle pedal), the upper surface of the throttle safety switch is nearly level with the top of the throttle pedal. And when the throttle is nearly fully depressed, the upper surface of the throttle safety switch is above the throttle. This geometry virtually guarantees that the throttle safety switch will be activated by a panicked driver in an emergency situation.

Besides the deactivation switch described hereinbefore, there are four distinct situations in which power is cut-off to the engine. The first of these situations is when the throttle safety switch, located to the left of the throttle in every embodiment of the present invention, is activated for the requisite time period; the second situation is when the throttle panic button, located beneath the throttle, is activated due to excessive depression of the throttle (i.e., due to excessive acceleration, whether intentional or unintentional); the third situation is when the computer interrogator detects excessive power and brake being applied simultaneously (e.g., drag racing); and the fourth is when the computer interrogator detects excessive acceleration, achieved not in a swift and nearly complete depression of the throttle, but instead by a rapid series of progressively greater depressions of the throttle. The computer interrogator detects this by monitoring the difference in the rate of rotation between the front and rear tires.

In every embodiment of the present invention, the pedals and control panel are oriented at an angle of 20° or more. It has been determined that most drivers' feet are most comfortable when positioned at angles in this range.

Certain aspects of the present invention are more readily understood by reference to the drawings. Referring now to the drawings, FIG. 1 illustrates a prior art driver's console 1 comprised, in pertinent part, of a throttle pedal 2, a brake pedal 3, an optional clutch pedal 4, and a floor 5.

Figure 2A:
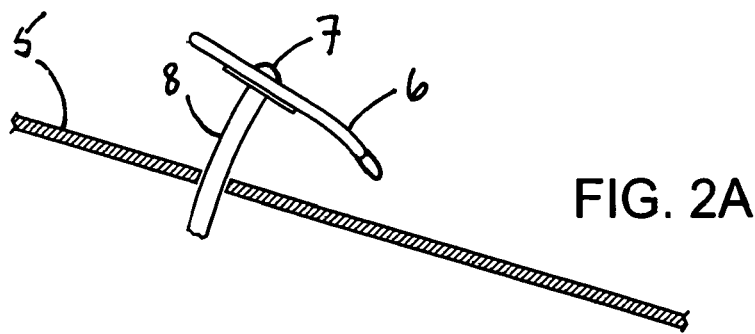
FIG. 2A is a side view of a reshaped pedal in accordance with an embodiment of the present invention.
Figure 3A:
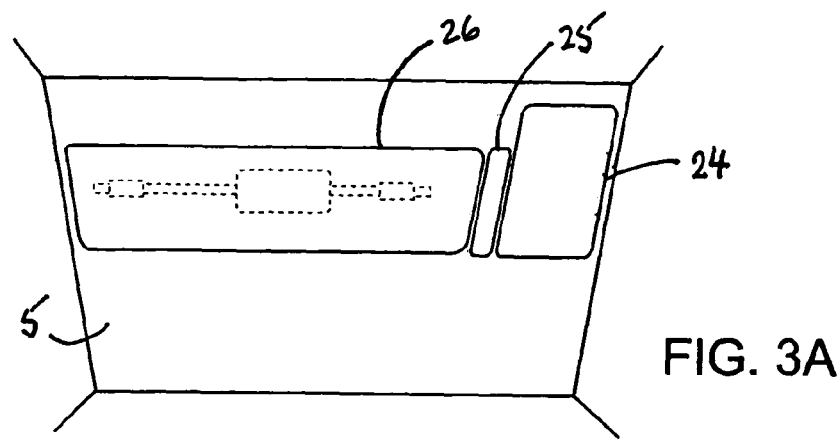
FIG. 3A is a front view of a footwell according to an automatic transmission version of the transition 1 embodiment of the present invention, featuring a horizontally extensive brake pedal.
Figure 3B:
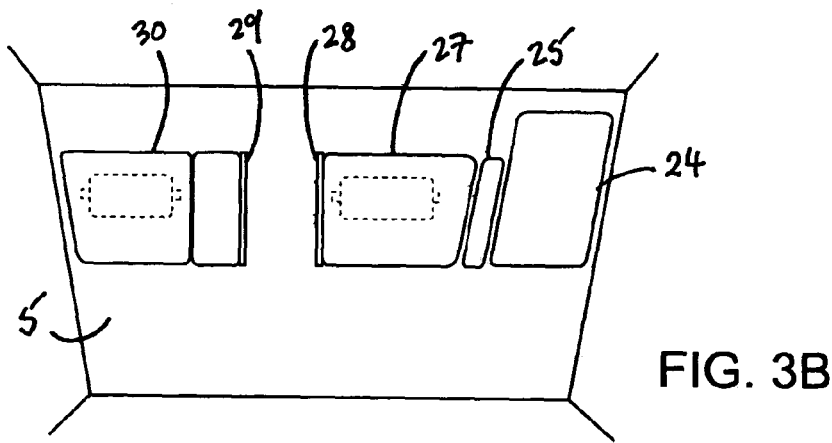
FIG. 3B is a front view of a footwell according to a manual transmission version of the transition 1 embodiment of the present invention depicted in FIG. 3A, comprising a clutch pedal and lateral stops.
Figure 3C:
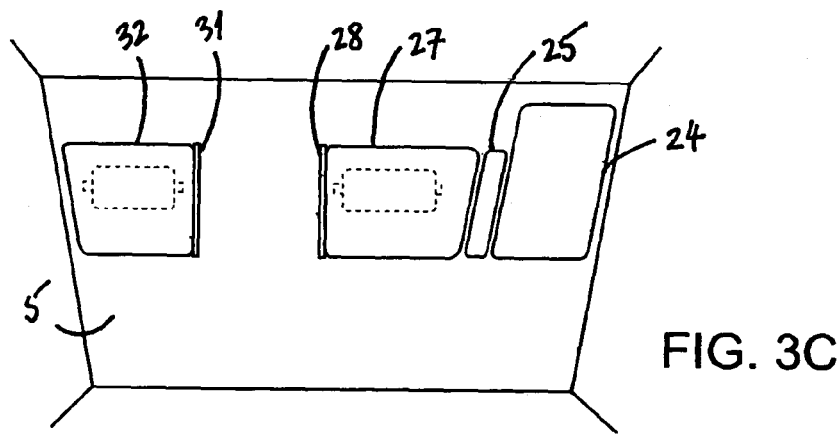
FIG. 3C is a front view of a footwell according to an automatic transmission version of the transition 1 embodiment of the present invention depicted in FIG. 3A, featuring a distinctly separated left brake pedal.

Referring now to FIG. 2A, illustrated, in profile, is the shape of the inventive extended pedals depicted in FIGS. 3A-3C. As shown, representative extended pedal 6 extends downward toward floor 5. This geometry decreases the possibility of a driver's foot being caught beneath the underside of any of the pedals depicted in FIGS. 3A-3C. Pedal locator 7, which can assume the form of horizontals ribs, or any other suitable protuberance(s), and can be disposed on and along the top surface of any or all the pedals depicted in FIGS. 3A-3C, assists a driver in properly positioning his or her foot on a desired pedal, but is optional. Pedal locator 7, if present, is disposed on and across the top surface of any or all of the pedals depicted in FIGS. 3A-3C, and positioned to be centered above pedal shaft 8.

Figure 2B:
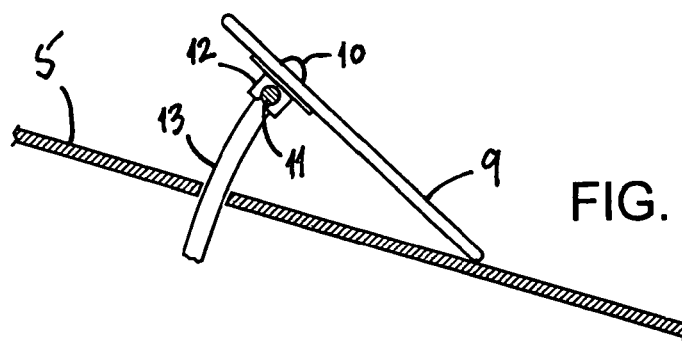
FIG. 2B is a side-view depiction of a clamped control panel, freely slideable at its bottom edge, in accordance with an embodiment of the present invention.
Figure 4A:
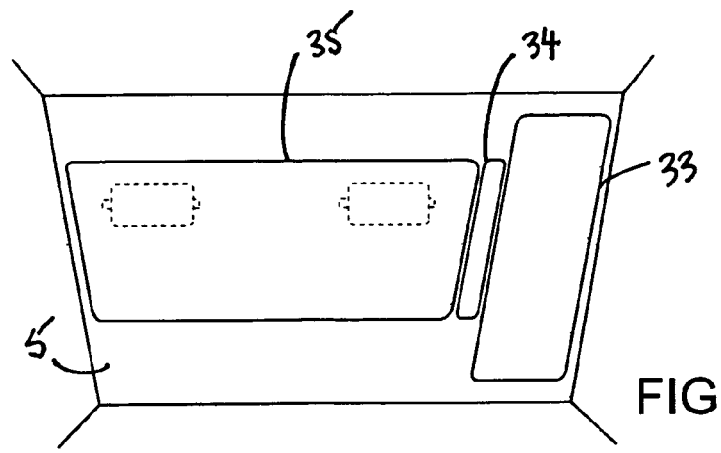
FIG. 4A is a front view of a footwell according to an automatic transmission version of the transition 2 embodiment of the present invention, featuring a horizontally extensive brake panel.
Figure 4B:
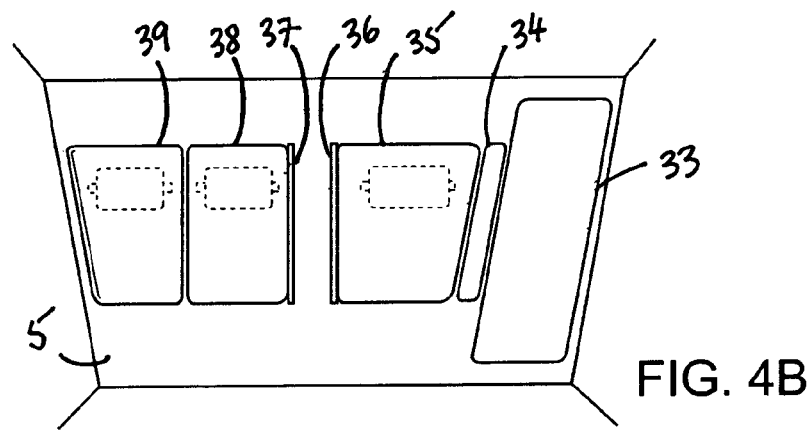
FIG. 4B is a front view of a footwell according to a manual transmission version of the transition 2 embodiment of the present invention depicted in FIG. 4A, comprising a clutch panel and lateral stops.
Figure 4C:
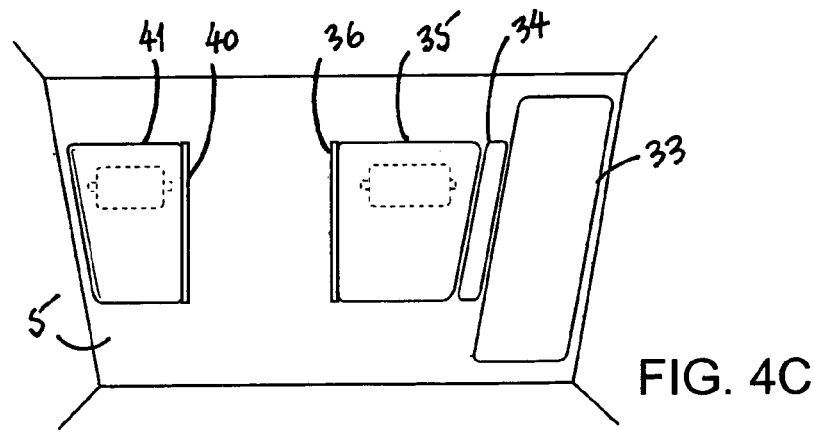
FIG. 4C is a front view of a footwell according to an automatic transmission version of the transition 2 embodiment of the present invention depicted in FIG. 4A, featuring a distinctly separated left brake panel having a lateral stop.

Referring now to FIG. 2B, illustrated, in profile, is the shape of the partial panels depicted in FIGS. 4A-4C. As shown, representative partial panel 9 is clamped to pedal shaft rod 11 (not depicted in FIGS. 4A-4C) via clamp 12. The lowermost portion of representative partial panel 9, which contacts floor 5, freely slides along floor 5 of the embodiments depicted in FIGS. 4A-C. This panel geometry reduces the possibility that a driver, faced with an emergency situation, will get his or her feet caught beneath one or more of the partial panels. Pedal shaft rod 11 extends through each pedal shaft 13 (throttle, brake(s), clutch) present (but not depicted) in the partial panel embodiments shown in FIGS. 4A-4C. Pedal shaft rod 11, however, does not extend through any of throttle safety switches 34 depicted in FIGS. 4A-4C. Pedal locator 10 (not depicted in FIGS. 4A-4C), if elected, is positioned and serves the same purpose as pedal locator 7 described with respect to FIGS. 3A-3C.

Figure 2C:
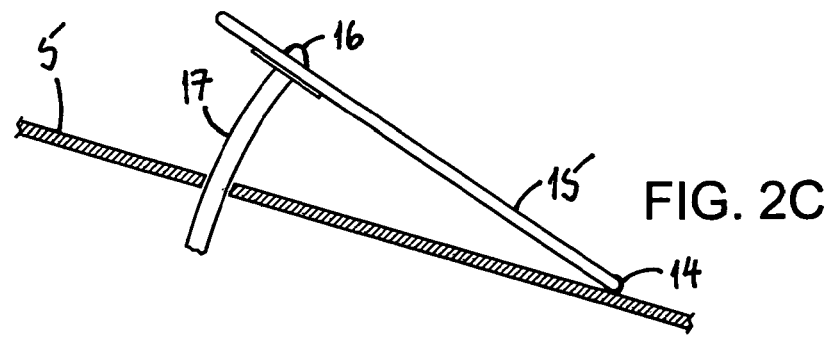
FIG. 2C is a side-view of a control panel that is permanently fixed at both its upper and lower ends, accordance with an embodiment of the present invention.
Figure 5A:
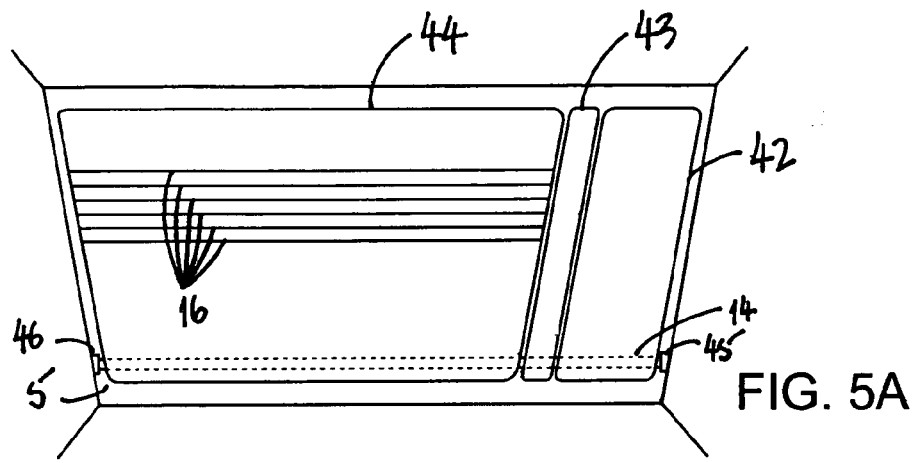
FIG. 5A is a front view of a footwell according to an automatic transmission version of the transition 3 embodiment of the present invention, featuring a horizontally extensive brake panel.
Figure 5B:
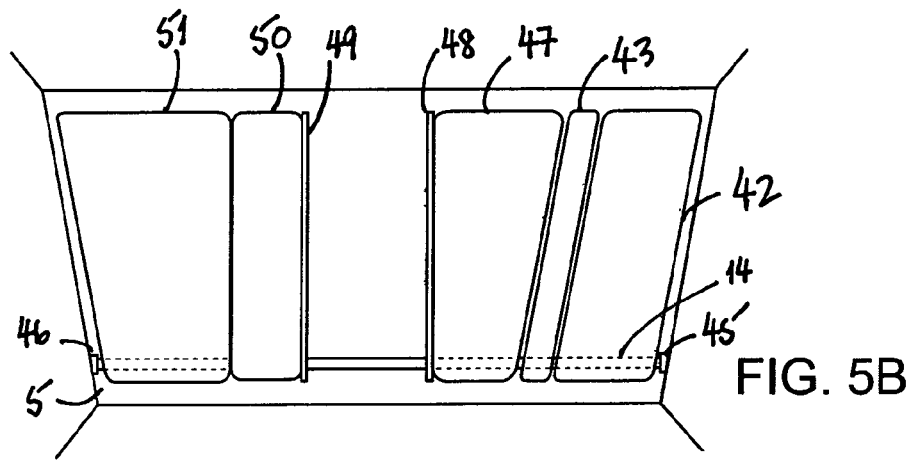
FIG. 5B is a front view of a footwell according to a manual transmission version of the transition 3 embodiment of the present invention depicted in FIG. 5A, comprising a clutch panel and lateral stops.
Figure 5C:
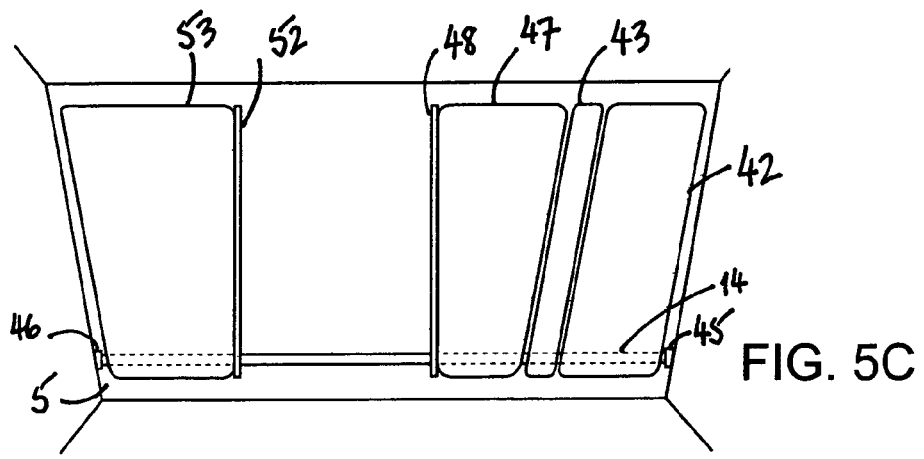
FIG. 5C is a front view of a footwell according to an automatic transmission version of the transition 2 embodiment of the present invention depicted in FIG. 5A, featuring a distinctly separated left brake panel.

Referring now to FIG. 2C, illustrated, in profile, is the shape of the factory-installed panels depicted in FIGS. 5A-5C. As shown, representative factory-installed full-length panel 15 is permanently affixed to pedal shaft rod 17 (not depicted in FIGS. 5A-5C), and the lowermost portion of panel 15 is permanently attached to securing rod 14, disposed, as shown, directly above floor 5. Every panel and throttle safety switch depicted in the various embodiments of FIGS. 5A-5C is attached to securing rod 14. Optional panel locator 16 (which is also depicted in FIG. 5A) is positioned and serves the same purpose as pedal locators 7 and 10 described above.

Figure 2D:
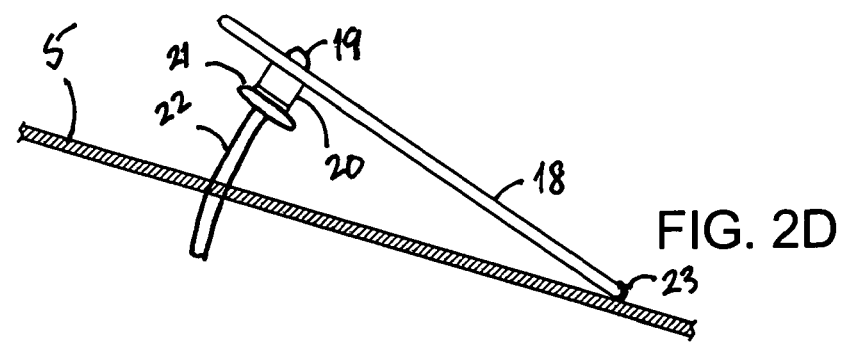
FIG. 2D is a side view of a control panel to which blocks are affixed, according to an embodiment of the present invention, for converting a motor vehicle having conventional pedal structure to the flat-surfaced foot control panel of the present invention.

Referring now to FIG. 2D, illustrated, in profile, is the configuration (depicted in FIGS. 6A-6C) of a retrofit conversion embodiment in which representative full-length panel 18 is shown overlying representative block 20 and representative pedal 21. Representative full-length panel 18 is attached to removable securing rod 23, disposed, as shown, directly above floor 5. Optional pedal locator 19 (not depicted in FIGS. 5A-5C) is positioned and serves the same purpose as locators 7, 10, and 16 described above.

Referring now to FIG. 3A, illustrated is an extended-length pedal embodiment of the present invention for motor vehicles having automatic transmissions. The leftmost side of extended-length brake pedal 26 is disposed in angled proximity to the leftmost side of floor 5 (there being a uniform $3/16$" (approximate) separation between the left wall of the footwell (not depicted) and the leftmost side of brake pedal 26), brake pedal 26 extending rightward and terminating in angled proximity to, and with approximately $3/16$" uniform separation therebetween, the leftmost side of throttle safety switch 25. Throttle safety switch 25 extends rightward, its rightmost side terminating in angled proximity to, and with approximately $3/16$" uniform separation therebetween, the leftmost side of throttle 24. Throttle 24 extends rightward, its rightmost side terminating in angled proximity to, and with approximately $3/16$" uniform separation therebetween, the right wall of the footwell (not depicted).

Referring now to FIG. 3B, illustrated is an extended-length pedal embodiment of the present invention for motor vehicles having manual transmissions. The leftmost side of extended-length left brake pedal 30 is disposed in angled proximity to the leftmost side of floor 5 (there being a uniform $3/16$" (approximate) separation between the left wall of the footwell (not depicted) and the leftmost side of brake pedal 30), left brake pedal 30 extending rightward, its rightmost side terminating uniformly with an approximate $3/16$" separation from the leftmost side of clutch 29. Clutch 29 extends rightward, terminating in a lateral stop (not separately labeled). The leftmost side of right brake pedal 27 comprises a lateral stop 28. Right brake pedal 27 extends rightward, its rightmost side terminating in angled proximity to, and with approximately $3/16$" uniform separation therebetween, the leftmost side of throttle safety switch 25. Throttle safety switch 25 extends rightward, its rightmost side terminating in angled proximity to, and with approximately $3/16$" uniform separation therebetween, the leftmost side of throttle 24. Throttle 24 extends rightward, its rightmost side terminating in angled proximity to, and with approximately $3/16$" uniform separation therebetween, the right wall of the footwell (not depicted).

Figure 3D:
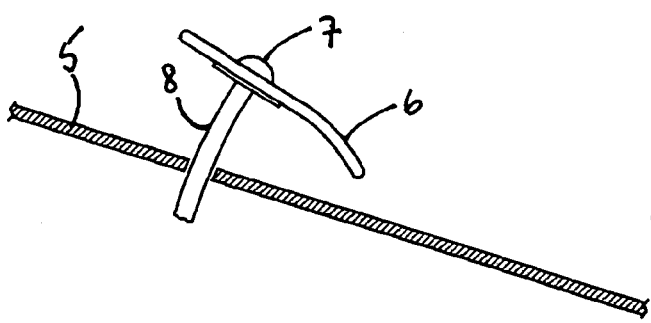
FIG. 3D is the same as FIG. 2A, but is repeated on drawing sheet 3 for convenience.

Referring now to FIG. 3C, illustrated is an extended-length pedal embodiment of the present invention for motor vehicles having automatic transmissions. By way of comparison, this embodiment differs from that depicted above in FIG. 3B in that it does not comprise clutch pedal 29 and that it is the rightmost side of left brake panel 32 (and not clutch panel 29, as in FIG. 4B) that comprises a lateral stop (31). FIG. 3D illustrates the side-view.

Referring now to FIG. 4A, illustrated is a partial-length panel embodiment of the present invention for motor vehicles having automatic transmissions. The leftmost side of partial-length brake pedal 35 is disposed in angled proximity to the leftmost side of floor 5 (there being a uniform $3/16$" (approximate) separation between the left wall of the footwell (not depicted) and the leftmost side of brake pedal 26), brake pedal 35 extending rightward and terminating in angled proximity to, and with approximately $3/16$" uniform separation therebetween, the leftmost side of throttle safety switch 34. Throttle safety switch 34 extends rightward, its rightmost side terminating in angled proximity to, and with approximately $3/16$" uniform separation therebetween, the leftmost side of throttle 33. Throttle 33 extends rightward, its rightmost side terminating in angled proximity to, and with approximately $3/16$" uniform separation therebetween, the right wall of the footwell (not depicted).

Referring now to FIG. 4B, illustrated is an partial-length panel embodiment of the present invention for motor vehicles having manual transmissions. The leftmost side of partial-length left brake panel 39 is disposed in angled proximity to the leftmost side of floor 5 (there being a uniform $3/16$" (approximate) separation between the left wall of the footwell (not depicted) and the leftmost side of left brake panel 39), left brake panel 39 extending rightward, its rightmost side terminating uniformly with an approximate $3/16$" separation from the leftmost side of clutch panel 38. Clutch 38 extends rightward, terminating in a lateral stop 37. The leftmost side of right brake panel 35 comprises a lateral stop 36. Right brake pedal 27 extends rightward, its rightmost side terminating in angled proximity to, and with approximately $3/16$" uniform separation therebetween, the leftmost side of throttle safety switch 34. Throttle safety switch 34 extends rightward, its rightmost side terminating in angled proximity to, and with approximately $3/16$" uniform separation therebetween, the leftmost side of throttle panel 33. Throttle 33 extends rightward, its rightmost side terminating in angled proximity to, and with approximately $3/16$" uniform separation therebetween, the right wall of the footwell (not depicted).

Figure 4D:
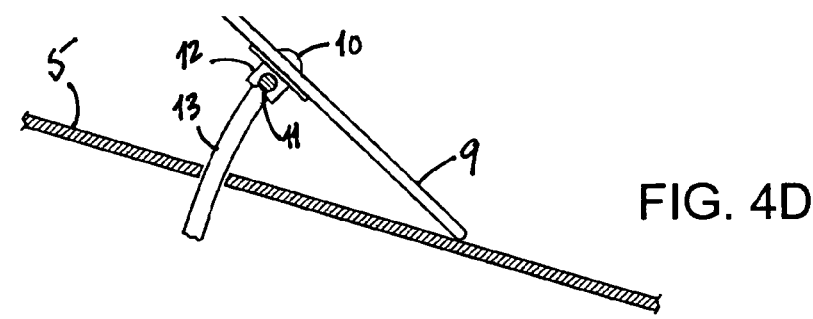
FIG. 4D is the same as FIG. 2B, but is repeated on drawing sheet 4 for convenience.

Referring now to FIG. 4C, illustrated is a partial-length panel embodiment of the present invention for motor vehicles having automatic transmissions. By way of comparison, this embodiment differs from that depicted above in FIG. 4B in that it does not comprise clutch panel 38 and that it is the rightmost side of left brake panel 41 (and not clutch panel 38, as in FIG. 4B) that comprises a lateral stop (40). FIG. 4D depicts a side-view.

Referring now to FIG. 5A, illustrated is a full-length panel embodiment of the present invention for motor vehicles having automatic transmissions. The leftmost side of full-length brake panel 44 is disposed in angled proximity to the leftmost side of floor 5 (there being a uniform $3/16$" (approximate) separation between the left wall of the footwell (not depicted) and the leftmost side of brake panel 44), brake panel 44 extending rightward and terminating in angled proximity to, and with approximately $3/16$" uniform separation therebetween, the leftmost side of throttle safety switch 43. Throttle safety switch 43 extends rightward, its rightmost side terminating in angled proximity to, and with approximately $3/16$" uniform separation therebetween, the leftmost side of throttle 42. Throttle 42 extends rightward, its rightmost side terminating in angled proximity to, and with approximately $3/16$" uniform separation therebetween, the right wall of the footwell (not depicted). Panel locator 16 allows a driver to determine (without having to look down) proper foot placement on brake panel 44, a teaching that is either optional or generalizable to every pedal and panel taught in the present invention. Also depicted is securing rod 14, to which all panels and throttle safety switches are connected. Securing rod 14 is permanently installed, at a factory, in receiving sleeves 45 and 46.

Referring now to FIG. 5B, illustrated is a full-length panel embodiment of the present invention for motor vehicles having manual transmissions. The leftmost side of full-length left brake panel 51 is disposed in angled proximity to the leftmost side of floor 5 (there being a uniform $3/16$" (approximate) separation between the left wall of the footwell (not depicted) and the leftmost side of left brake panel 51), left brake panel 51 extending rightward, its rightmost side terminating uniformly with an approximate 3/16" separation from the leftmost side of clutch panel 50. Clutch 50 extends rightward, terminating in a lateral stop 49. The leftmost side of right brake panel 47 comprises a lateral stop 48. Right brake pedal 47 extends rightward, its rightmost side terminating in angled proximity to, and with approximately 3/16" uniform separation therebetween, the leftmost side of throttle safety switch 43. Throttle safety switch 43 extends rightward, its rightmost side terminating in angled proximity to, and with approximately 3/16" uniform separation therebetween, the leftmost side of throttle panel 42. Throttle 42 extends rightward, its rightmost side terminating in angled proximity to, and with approximately 3/16" uniform separation therebetween, the right wall of the footwell (not depicted).

Figure 5D:
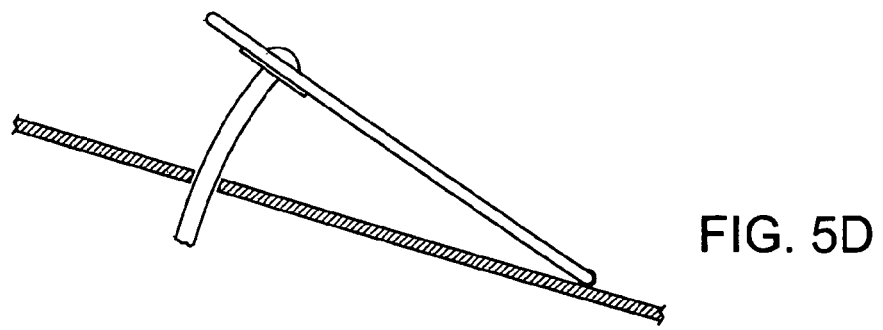
FIG. 5D is the same as FIG. 2C, but is repeated on drawing sheet 5 for convenience.

Referring now to FIG. 5C, illustrated is a partial-length panel embodiment of the present invention for motor vehicles having automatic transmissions. By way of comparison, this embodiment differs from that depicted above in FIG. 5B in that it does not comprise clutch panel 50 and that it is the rightmost side of left brake panel 53 (and not clutch panel 50, as in FIG. 5B) that comprises a lateral stop (52). FIG. 5D depicts a side-view.

Figure 6A:
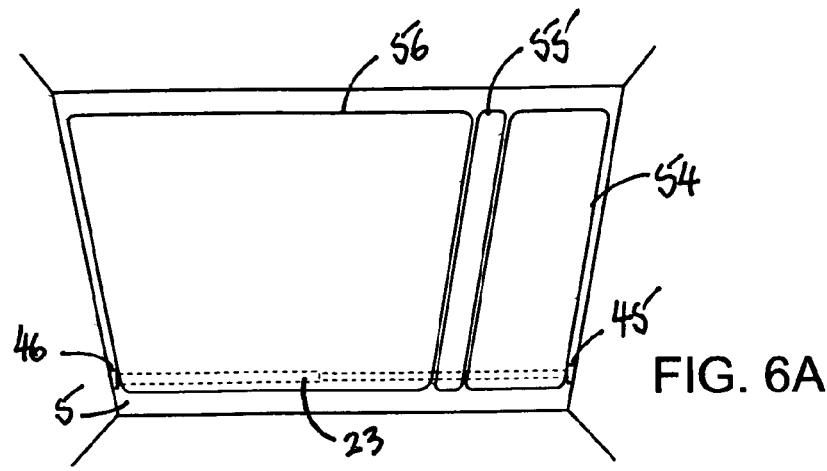
FIG. 6A is a front view of a footwell according to an automatic transmission version of the conversion embodiment of the present invention, featuring a horizontally extensive brake panel.

Referring now to FIG. 6A, illustrated is a full-length panel embodiment of the present invention for motor vehicles having automatic transmissions. The leftmost side of full-length brake panel 56 is disposed in angled proximity to the leftmost side of floor 5 (there being a uniform 3/16" (approximate) separation between the left wall of the footwell (not depicted) and the leftmost side of brake panel 56), brake panel 56 extending rightward and terminating in angled proximity to, and with approximately 3/16" uniform separation therebetween, the leftmost side of throttle safety switch 55. Throttle safety switch 55 extends rightward, its rightmost side terminating in angled proximity to, and with approximately 3/16" uniform separation therebetween, the leftmost side of throttle 54. Throttle 54 extends rightward, its rightmost side terminating in angled proximity to, and with approximately 3/16" uniform separation therebetween, the right wall of the footwell (not depicted). Also depicted is removable securing rod 23, to which all panels and throttle safety switches are connected. Removable securing rod 23 is spring-loaded and secured in receiving sleeves 45 and 46.

Figure 6B:
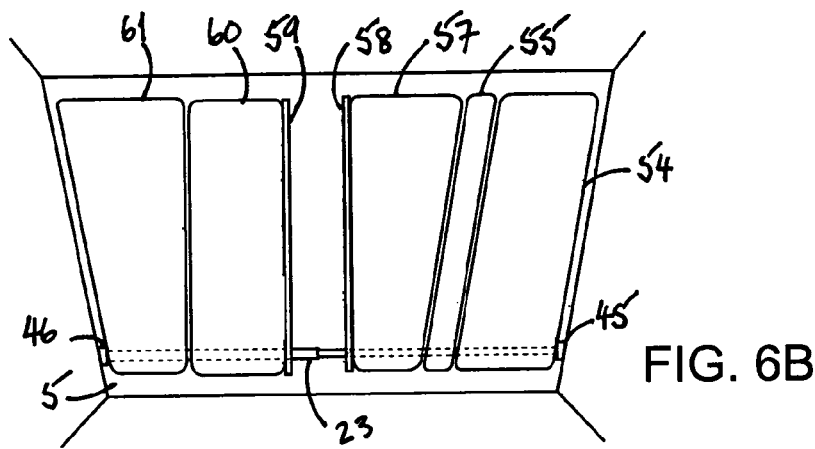
FIG. 6B is a front view of a footwell according to a manual transmission version of the conversion embodiment of the present invention depicted in FIG. 6A, comprising a clutch panel as well as lateral stops.

Referring now to FIG. 6B, illustrated is a full-length panel embodiment of the present invention for motor vehicles having manual transmissions. The leftmost side of full-length left brake panel 61 is disposed in angled proximity to the leftmost side of floor 5 (there being a uniform 3/16" (approximate) separation between the left wall of the footwell (not depicted) and the leftmost side of left brake panel 61), left brake panel 61 extending rightward, its rightmost side terminating uniformly with an approximate 3/16" separation from the leftmost side of clutch panel 60. Clutch 60 extends rightward, terminating in a lateral stop 59. The leftmost side of right brake panel 57 comprises a lateral stop 58. Right brake pedal 57 extends rightward, its rightmost side terminating in angled proximity to, and with approximately 3/16" uniform separation therebetween, the leftmost side of throttle safety switch 55. Throttle safety switch 55 extends rightward, its rightmost side terminating in angled proximity to, and with approximately 3/16" uniform separation therebetween, the leftmost side of throttle panel 54. Throttle 54 extends rightward, its rightmost side terminating in angled proximity to, and with approximately 3/16" uniform separation therebetween, the right wall of the footwell (not depicted).

Figure 6C:
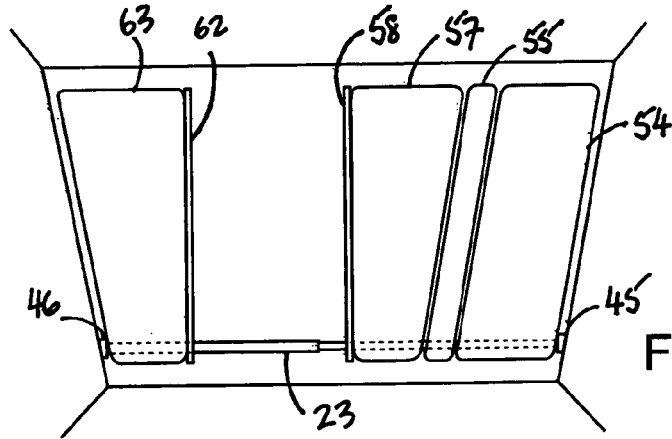
FIG. 6C is a front view of a footwell according to an automatic transmission version of the conversion embodiment of the present invention depicted in FIG. 6A, featuring a distinctly separated left brake panel.
Figure 6D:
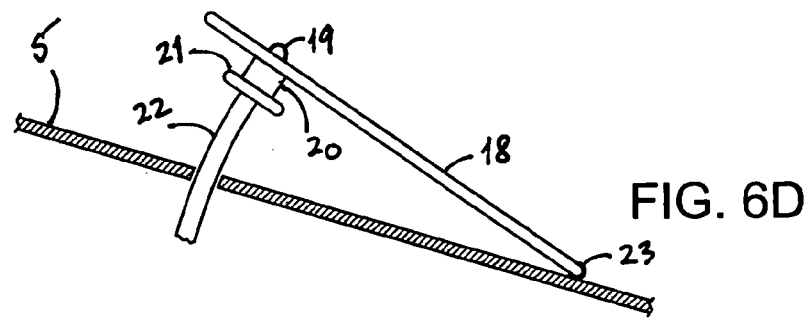
FIG. 6D is the same as FIG. 2D, but is repeated on drawing sheet 6 for convenience.

Referring now to FIG. 6C, illustrated is a partial-length panel embodiment of the present invention for motor vehicles having automatic transmissions. By way of comparison, this embodiment differs from that depicted above in FIG. 6B in that it does not comprise clutch panel 60 and that it is the rightmost side of left brake panel 57 (and not clutch panel 60, as in FIG. 6B) that comprises a lateral stop (62). FIG. 6D depicts a side-view.

Figure 7A:
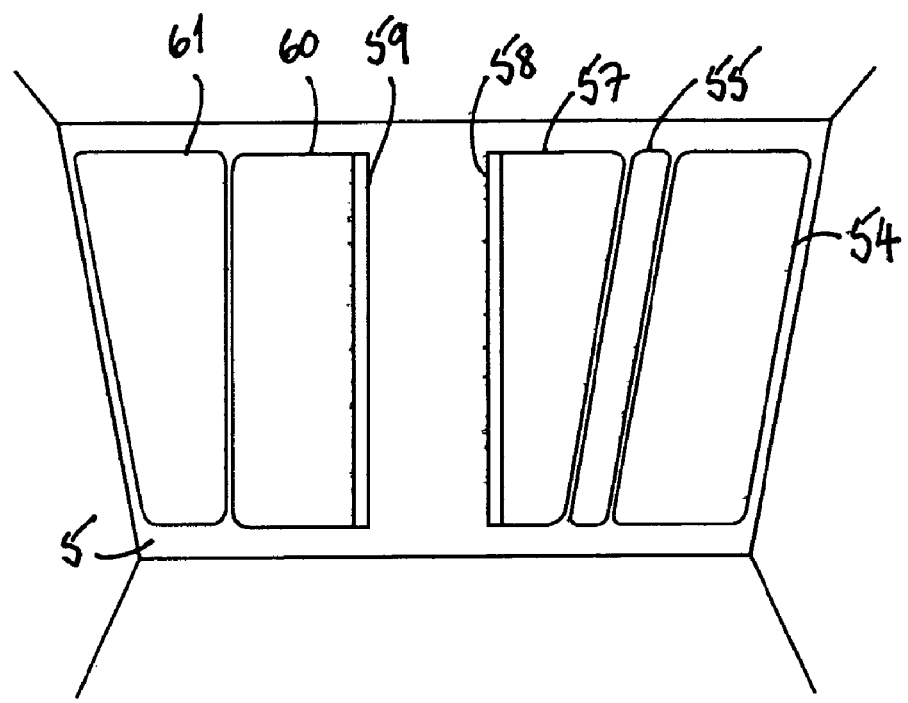
FIG. 7A depicts the panel arrangement shown obliquely in FIG. 7B.

Referring now to FIG. 7A, illustrated is a full-length panel configuration for a manual transmission embodiment of the present invention. Positioned above floor 5 is (from left to right) left brake panel 61, clutch panel 60 (equipped with right-hand lateral stop 59), right brake panel (equipped with left-hand lateral stop 58), throttle safety switch 55, and throttle panel 54.

Figure 7B:
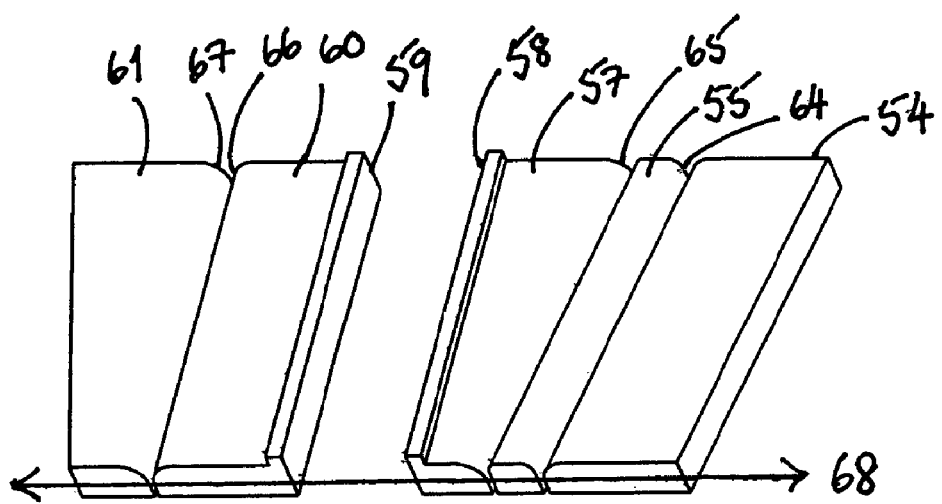
FIG. 7B depicts an oblique view of the beveled edges and stops of the panel arrangement depicted in FIG. 7A.

Referring now to FIG. 7B, illustrated is an oblique view of the panels depicted in FIG. 7A. From this perspective, not only can one see the raised nature of lateral stops 58 and 59, depicted in plan view in FIG. 7A, but also the beveled edges (e.g., 64, 65, 66, and 67) provided on one or both sides of each pedal and panel taught in the present invention. The lateral stops serve the purpose of giving a driver the security (without having to look down) that his or her foot is on the desired pedal. In addition, in those embodiments in which a spacer is not disposed between the left brake or clutch and the right brake, the lateral stops serve to keep a driver's feet from inadvertently sliding down onto the exposed floor 5 between the left brake (if manual, the clutch) and the right brake. The beveled edges of the various pedals and panels, meanwhile, facilitate the sliding of a foot between the various panels. Reference numeral 68 depicts the lowermost edge of the plane with respect to which the panels are in substantial alignment (the angle of the pedals as depicted in FIG. 7B substantially defining the angle at which this plane is oriented).

Figure 8A:
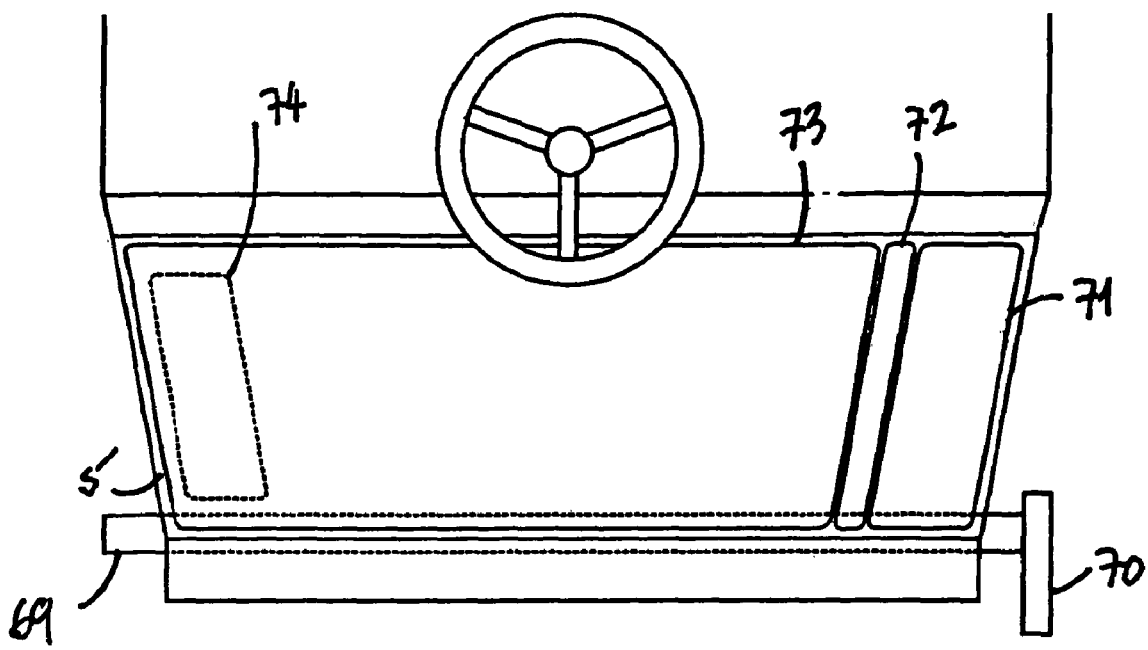
FIG. 8A is a front view of a factory-installed full panel embodiment of the anti-panic braking and anti power-abuse system according to the present invention.

Referring now to FIG. 8A, illustrated is a full-panel embodiment of the present invention. Full-panel brake 73 is fixedly attached to brake rod 69, while throttle safety switch 72 and throttle panel 71 rotate freely about brake rod 69. Reference numeral 74 depicts the preferred default position that a driver's left foot should assume on full-panel brake 73. Brake extension arm 70 (though shown as being on the right in FIG. 8A, can be disposed either to the left or to the right and is connected to normal brake linkage as though from normal brake shaft position) provides a driver the option of initiating braking by hand, in lieu of or in addition to foot-initiated braking.

Figure 8B:
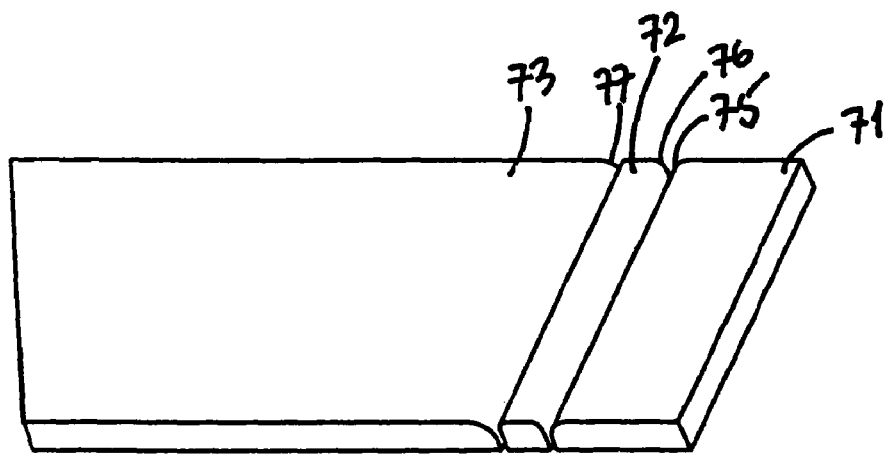
FIG. 8B is an oblique view of the beveled edges of the panel arrangement depicted in FIG. 8A.

Referring now to FIG. 8B, depicted is an oblique view of the panel arrangement depicted in FIG. 8A, including beveled edges 75, 76, and 77.

Figure 9A:
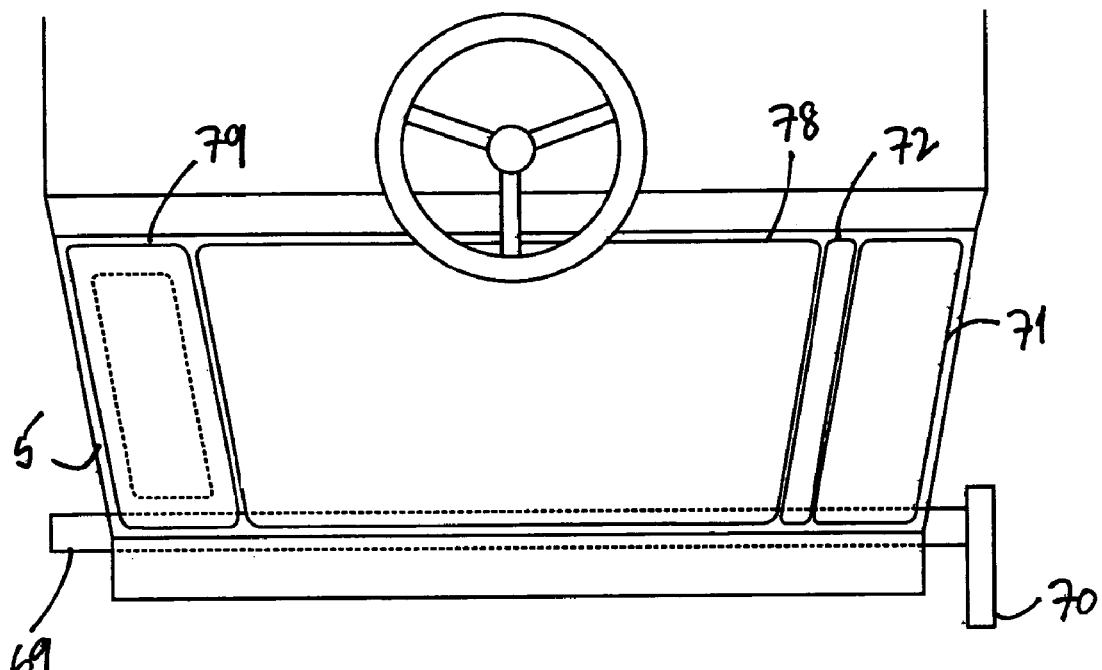
FIG. 9A is a front view of an alternative factory-installed full panel embodiment of the anti-panic braking and anti power-abuse system according to the present invention.

Referring now to FIG. 9A, illustrated is another embodiment of the present invention, differing from that depicted in FIG. 8A. Panel 79 is the left brake (the dotted line representing the preferred default position of the left foot), and panel 78 is a spacer panel. Brake rod 69 and brake extension arm 70 function as described above with respect to FIG. 8A.

Figure 9B:
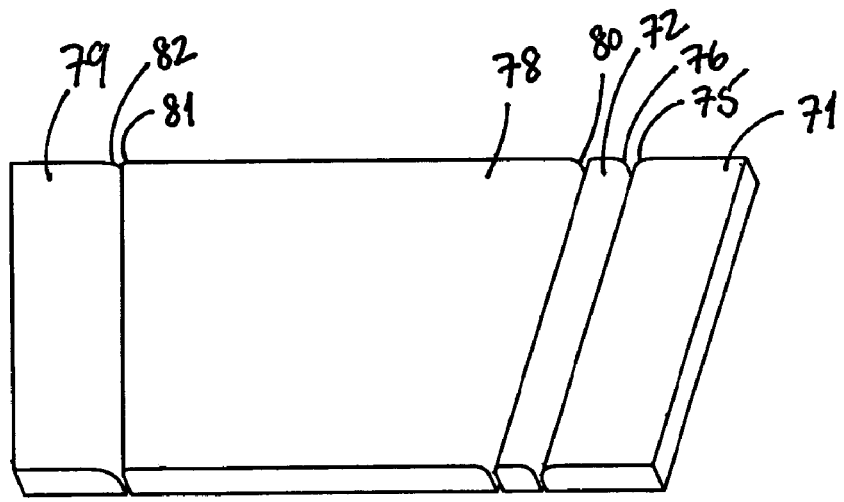
FIG. 9B is an oblique view of the beveled edges of the panel arrangement depicted in FIG. 9A.

Referring now to FIG. 9B, depicted is an oblique view of the panel arrangement depicted in FIG. 9A, including beveled edges 75, 76, 80, 81, and 82.

Figure 10A:
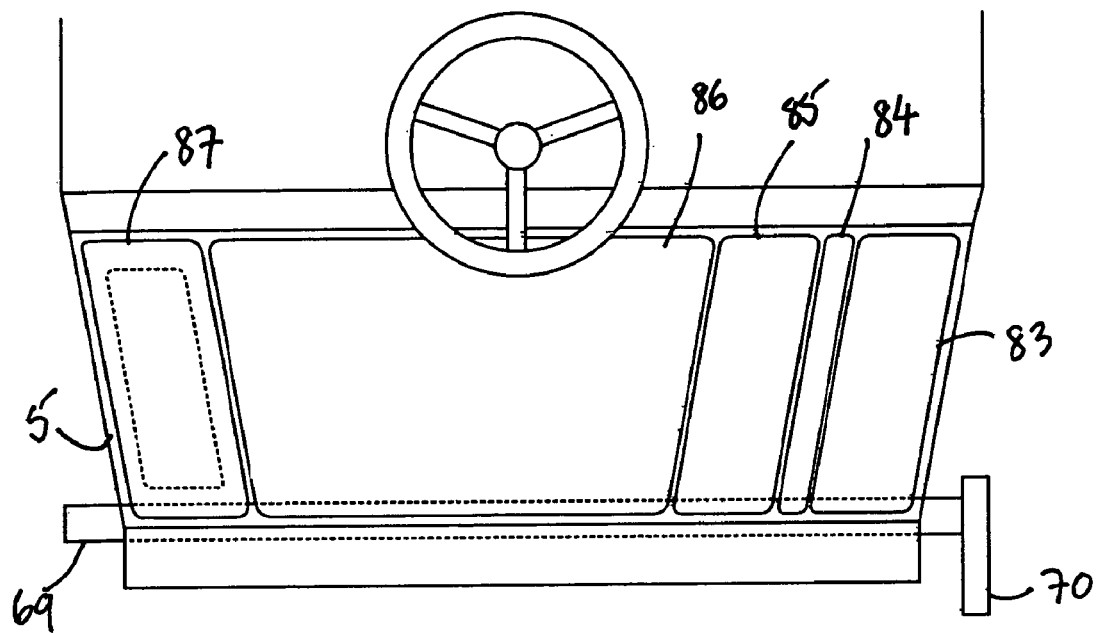
FIG. 10A is a front view of yet another alternative factory-installed full panel embodiment of the anti-panic braking and anti power-abuse system according to the present invention.

Referring now to FIG. 10A, illustrated is still another embodiment of the present invention, differing from that depicted in FIG. 9A. A right brake panel 85 is now interposed between throttle safety switch 84 and spacer panel 86. The left brake panel is denoted by reference numeral 87 (the dotted line on same representing the preferred default position of the left foot), panel 83 being the throttle panel. Brake rod 69 and brake extension arm 70 function as described above with respect to FIG. 8A. The fixed non-movable spacer panel 86 is a preferred inclusion.

Figure 10B:
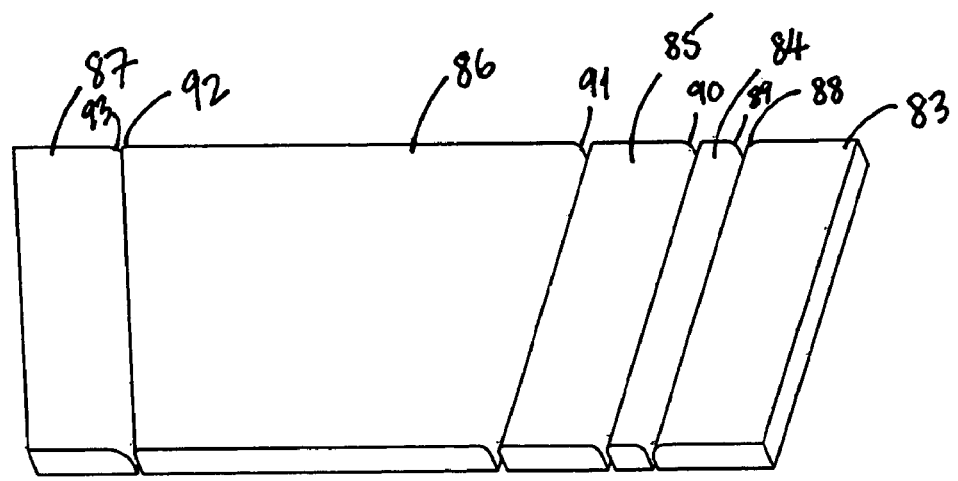
FIG. 10B is an oblique view of the beveled edges of the panel arrangement depicted in FIG. 10A.

Referring now to FIG. 10B, depicted is an oblique view of the panel arrangement depicted in FIG. 10A, including beveled edges 88, 89, 90, 91, 92, and 93.

Figure 11A:
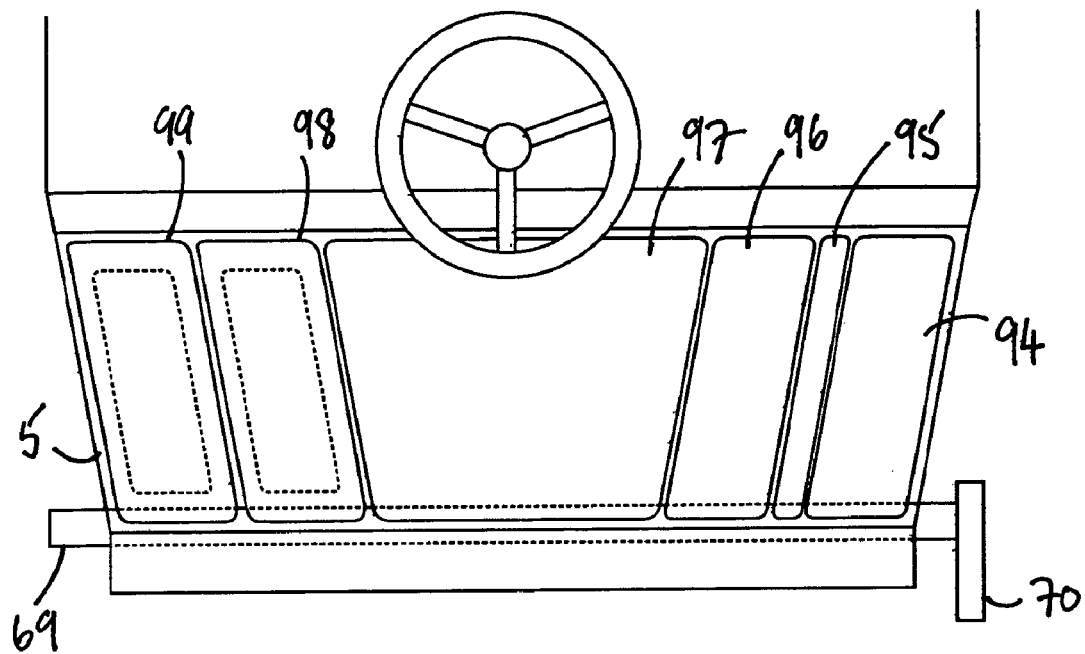
FIG. 11A is a front view of still yet another alternative factory-installed full panel embodiment of the anti-panic braking and anti power-abuse system according to the present invention.

Referring now to FIG. 11A, illustrated is yet another embodiment of the present invention comprising (from left to right, in pertinent part) a left brake panel 99, a clutch panel 98, a spacer panel 97, a right brake panel 96, a throttle safety switch 94. Brake rod 69 and brake extension arm 70 function as described above with respect to FIG. 8A.

Figure 11B:
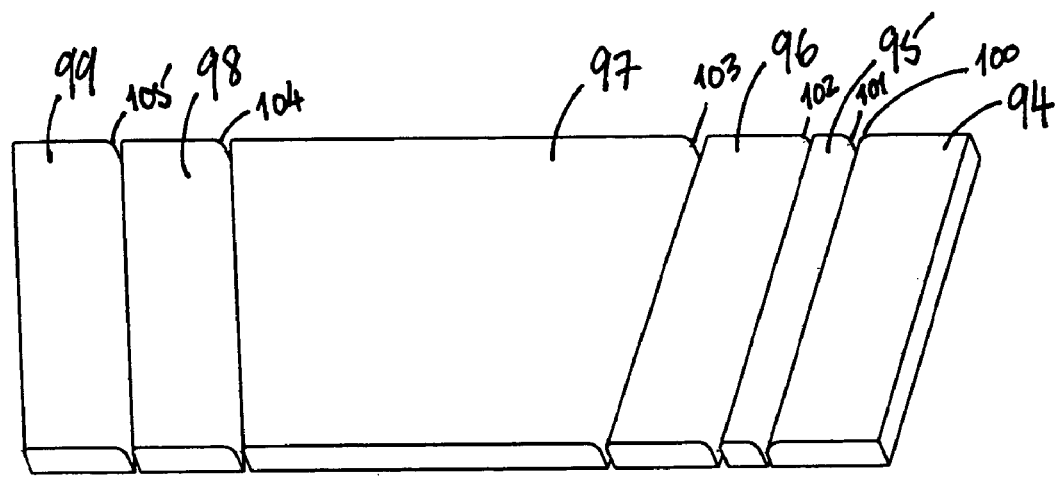
FIG. 11B is an oblique view of the beveled edges of the panel arrangement depicted in FIG. 11A.

Referring now to FIG. 11B, depicted is an oblique view of the panel arrangement depicted in FIG. 11A, including beveled edges 100, 101, 102, 103, 104, and 105.

Figure 12:
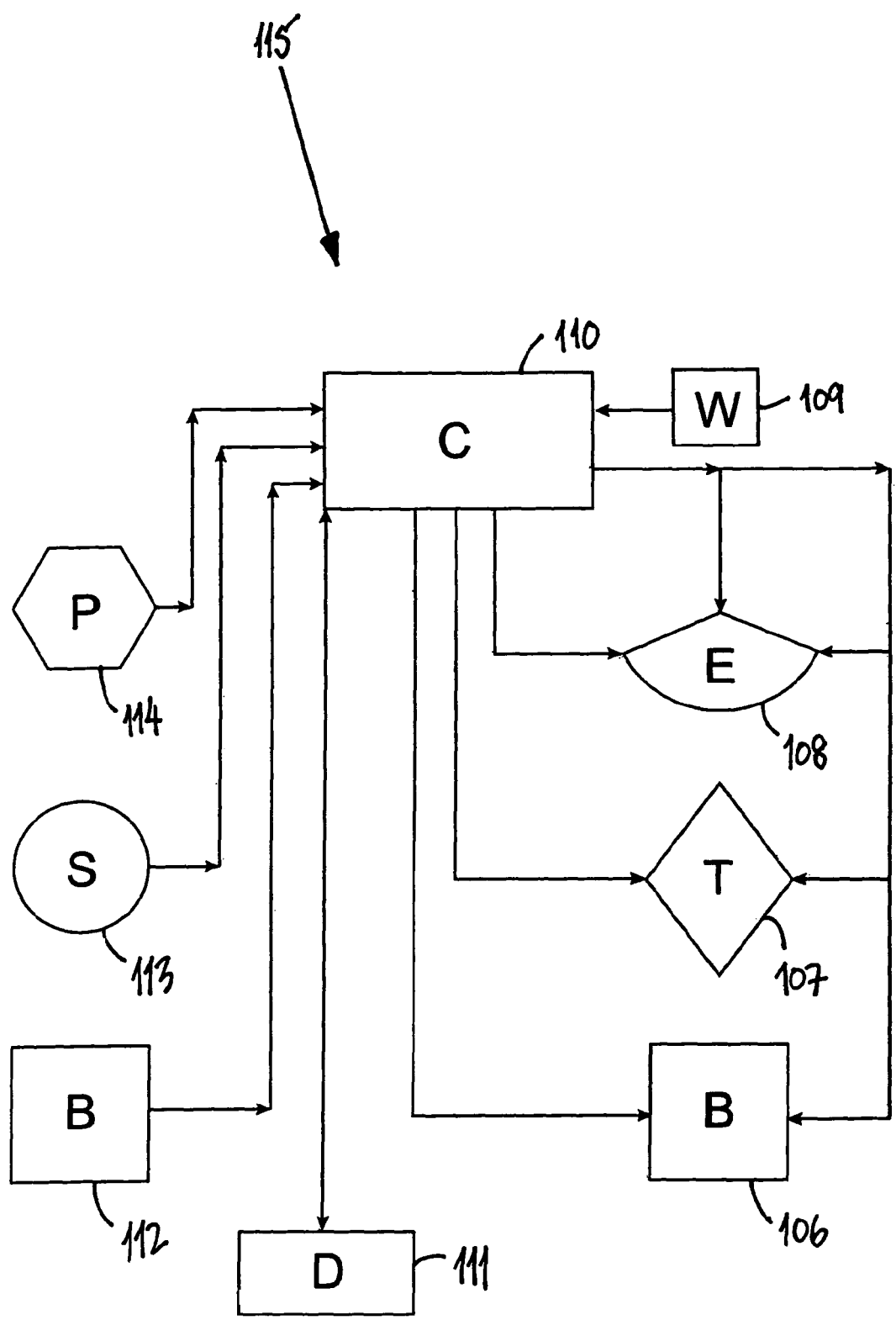
FIG. 12 is an illustration, in schematic form, of a computer interrogator system according to the present invention.

Referring now to FIG. 12, illustrated in schematic form is computer interrogator system 115. This system comprises interrogator computer 110, which receives information from the manifold pressure sensor 114 and then compares it to the present speed and rate of speed change from wheel rotation sensor 113 and the amount of brake pressure in the brake line 112. Interrogator computer 110 analyzes this information to determine if the probable outcome of the driver's actions are either dangerous or seriously illegal. If such a danger exists, the driver will receive a warning (presented in a series of three loud beeps) from alarm 109 so he or she may take corrective action. If appropriate corrections are not forthcoming, electrical power to the distributer 108 will be cut off. Once a safe operation speed and power have been achieved, by the driver reducing throttle to idle position (thereby activating a reset micro-switch), all systems are returned to normal.

Other aspects of the present invention include, without limitation: the ability to use a flat-surfaced foot control platform to greatly minimize distance, time and effort for a sliding foot to accurately reach any control from any position. The simultaneous left foot coordination of the brake and clutch prevents unwanted vehicle movement when shifting in manual transmission cars. The throttle control power cutoff safety switch eliminates the possibility of petal error and associated unwanted acceleration. The power cut-off button below the throttle panel placed in such position is activated when the throttle is fully accelerated or "floor boarded." A computer activated power cut-off impulse is generated when excessive power and braking are used simultaneously. The simultaneous use and coordination of brake and power assists parking and maneuvering around obstacles. A disable switch can cancel any power off impulse for varied periods of time at a driver's discretion. Dual foot braking is possible with either or both feet simultaneously. The system allows for the ability to adjust the position of foot stops both manually and automatically. The raised and horizontally lined foot stop indicates the limit to forward foot motion, assuring accurate foot placement. The automatic computer power cut-off is activated any time there is throttle action which will result in an excessively rapid increase in power. The introduction of a 10 degree outlay of right foot on throttle and left foot on brake significantly corrects the negative aspect of a panic response.

EXAMPLE

In one example, the system of the present invention has the following features:

a) A brake pedal or panel (depending on the embodiment) is added to the far left of the driver's foot well to serve for left foot braking.

b) The left edge of the left brake, including foot stop or side wall, is angled outward ten degrees while the right edge of the left brake, rather than being also angled ten degrees outward to produce an angled rectangular pedal or panel, is aligned directly forward to produce a more fan like appearance resulting in a larger surface area.

c) In all automatic transmission cars, foot stops are placed on both left and right edges of the left brake. The stop on the left edge of the left brake may just as easily be the left side wall also angled outward ten degrees.

d) In all manual transmission cars, the left edge of the clutch pedal/panel is directly adjacent to the right edge of the left brake minus its foot stop to accommodate a sliding foot. The brake and clutch controls are separated by a maximum of 3/16 of an inch with the clutch control 1/4 inch higher than the brake control. The foot stop that would normally be on the right edge of the brake control is on the right edge of the clutch control.

e) The left and right edges of the throttle on the far right are also angled outward ten degrees creating angled rectangle and are always 1/4 inch higher than any other control. In this embodiment, the throttle is a plate.

f) Directly to the left of the throttle left edge and connected to the throttle framework but separated from the throttle plate is a safety switch which is also angled outward ten degrees. The switch is approximately one inch wide and proceeds from the bottom along side the left edge of the throttle a little more than half way upward.

g) The right brake pedal/panel is directly to the left of the throttle panel and allows for dual control. The right edge of the brake control aligns with the upper third of the throttle left edge at a ten degree outward angle. The lower half of the right brake edge aligns with the outward angled safety switch. The left edge of the right brake is conversely aligned straight ahead resulting in an enlarged area and fan like appearance similar to the left brake except for that portion required for the safety switch.

h) In addition, outermost controls on the left and right are angled outward ten degrees to take advantage of the long noted tendency of drivers to close their legs inward and turn their toes forward in emergency conditions as if to brace for possible impact. This natural response is taken into account in this design to insure that the driver will not only be on the brakes in such situations, but also shuts off accidental unwanted power.

i) On controls in that position where one might expect to find a pedal, a raised, horizontally lined foot stop is placed indicating to the driver his/her foot has reached the proper length forward.

The examples set forth above, in both the specification and the figures, are provided to give those of ordinary skill in the art with a complete disclosure and description of how to make and use the preferred embodiments of the present invention, and are not intended to limit the scope of what the inventors regard as their invention. Modifications of the above-described modes for carrying out the invention that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. An anti-panic braking system comprising:
 a throttle pedal having an idle position and an accelerated position;
 at least one brake pedal laterally displaced from the throttle;
 a throttle safety switch having an undepressed unactivated position and a depressed activated position, wherein the throttle safety switch is positioned laterally between the throttle and the brake pedal, and positioned alongside the throttle pedal when the throttle pedal is in the idle position and the throttle safety switch is in the unactivated position; and a power cutoff switch in operative communication with the throttle safety switch, the power cutoff switch is configured to cut-off power to the motor vehicle when the throttle safety switch is activated.

2. The system according to claim 1, further comprising a panic button operatively associated with the throttle pedal and in operative communication with the power cutoff switch, wherein the panic button is configured to activate the power cut off switch when the throttle pedal is fully depressed, and wherein the power cutoff switch is configured to cut-off power to the motor vehicle when activated by the panic button.

3. The system according to claim 1, further comprising a deactivator switch adapted to deactivate the power cut off switch.

4. The system according to claim 1, wherein the throttle pedal comprises a lower edge, and a surface for depressing the throttle pedal extending along a longitudinal axis at a non-perpendicular angle from the lower edge.

5. A pedal system for a vehicle having a footwell having a floor, a left wall and a right wall, the pedal system comprising:
 a throttle pedal having an undepressed idle position and a depressed acceleration position, the throttle pedal disposed in the footwell closer to the right wall than the left wall, wherein the throttle pedal comprises a surface for applying pressure to the throttle pedal to depress the throttle pedal;
 a first brake pedal disposed in the footwell laterally spaced apart from the throttle pedal and positioned between the throttle pedal and the left wall, the first brake pedal having a surface for applying pressure to the first brake pedal;
 a throttle safety switch having an unactivated position and a depressed activated position, the throttle safety switch disposed in the footwell alongside the throttle pedal between the first brake pedal and the throttle pedal, wherein the throttle safety switch comprises a surface for applying pressure to the throttle safety switch to activate the throttle safety switch;
 a panic button positioned beneath the throttle pedal, the panic button configured to activate when the throttle pedal is depressed and contacts the panic button; and
 a power cutoff switch operatively connected to the throttle safety switch and operatively connected to the panic button, wherein the power cutoff switch is configured to interrupt a supply of electricity to a distributor in the vehicle when either the throttle safety switch or the panic button is activated,
 wherein the throttle safety switch and the throttle pedal are configured such that the surface of the throttle safety switch is below the surface of the throttle pedal and closer to the footwell floor when the throttle safety switch is in the unactivated position and the throttle pedal is in the undepressed position.

6. The pedal system of claim 5, wherein the throttle safety switch and the throttle pedal are configured such that the surface of the throttle safety switch is above the surface of the throttle pedal and farther from the footwell floor when the throttle safety switch is in the unactivated position and the throttle pedal is in the depressed acceleration position.

7. The pedal system of claim 5, wherein the brake pedal has a depressed position and an undepressed position and is configured with the surface of the brake pedal below the surface of the throttle safety switch and closer to the footwell floor than the throttle safety switch when the throttle safety switch is in the unactivated position and the brake pedal is in the undepressed position.

8. The pedal system of claim 5, wherein the throttle safety switch comprises a beveled edge on a portion of the throttle safety switch disposed along the throttle pedal.

9. The pedal system of claim 5, wherein the throttle pedal comprises a rightmost edge adjacent to the right wall of the footwell.

10. The pedal system of claim 5, wherein the first brake pedal comprises a leftmost edge adjacent to the left wall of the footwell.

11. The pedal system of claim 5, further comprising a power cutoff deactivator switch operatively connected to the power cutoff switch, the deactivator switch configured to deactivate the power cutoff switch.

12. The pedal system of claim 5, further comprising a second brake pedal disposed in the footwell between the first brake pedal and the left wall of the footwell.

13. The pedal system of claim 12, wherein the second brake pedal comprises a leftmost edge adjacent to the left wall of the footwell.

14. The pedal system of claim 12, further comprising a clutch pedal disposed in the footwell between the first brake pedal and the second brake pedal.

15. The pedal system of claim 5, further comprising a horizontally adjustable wall stop mounted in the footwell.

16. The pedal system according to claim 5, wherein the throttle safety switch comprises a leftmost edge and the brake pedal extends laterally from adjacent the left wall of the footwell to adjacent the leftmost edge of the throttle safety switch.

17. An anti-panic braking and anti power-abuse system for a vehicle, comprising:
 a throttle pedal disposed in a footwell of a vehicle;
 at least one brake pedal disposed in the footwell of the vehicle; and
 a throttle safety switch disposed in the footwell of the vehicle, the throttle safety switch having an unactivated position and a depressed activated position, the throttle safety switch disposed in the footwell alongside the throttle pedal between the first brake pedal and the throttle pedal, wherein the throttle safety switch comprises a surface for applying pressure to the throttle safety switch to activate the throttle safety switch, and wherein the throttle safety switch is configured to cut-off power to the motor vehicle when the throttle safety switch is activated.

* * * * *